United States Patent [19]

Kitamura et al.

[11] Patent Number: 4,829,096

[45] Date of Patent: May 9, 1989

[54] BREATHABLE FILM AND PROCESS FOR PRODUCTION OF THE SAME

[75] Inventors: Shuji Kitamura, Kyoto; Kiyohiko Nakae, Hyogo; Kozo Kotani; Takanori Kume, both of Osaka, all of Japan

[73] Assignee: Sumitomo Chemical Company, Limited, Osaka, Japan

[21] Appl. No.: 74,118

[22] Filed: Jul. 16, 1987

[30] Foreign Application Priority Data

Jul. 16, 1986 [JP] Japan ............................ 61-167517
May 19, 1987 [JP] Japan ............................ 62-123187

[51] Int. Cl.$^4$ .......................... C08J 5/18; C08J 9/00; B29C 55/02; B29K 23/00
[52] U.S. Cl. .................................. 521/79; 521/143; 264/41; 264/288.8; 264/290.2; 264/DIG. 73
[58] Field of Search ................. 521/79, 143; 264/41, 264/147, 154, DIG. 73, 288.8, 290.2

[56] References Cited

U.S. PATENT DOCUMENTS

| | | | |
|---|---|---|---|
| 4,452,845 | 6/1984 | Lloyd et al. | 428/420 |
| 4,472,328 | 9/1984 | Sugimoto et al. | 524/583 |
| 4,678,813 | 7/1987 | Iroh et al. | 521/143 |
| 4,699,733 | 10/1987 | Matsumura et al. | 264/41 |
| 4,705,812 | 11/1987 | Ito et al. | 264/154 |
| 4,705,813 | 11/1987 | Ito et al. | 521/143 |

FOREIGN PATENT DOCUMENTS

| | | |
|---|---|---|
| 0227481 | 7/1987 | European Pat. Off. . |
| 87306309 | 2/1988 | European Pat. Off. . |
| 26534 | 6/1982 | Japan . |
| 15538 | 1/1983 | Japan . |
| 149303 | 9/1983 | Japan . |
| 149925 | 9/1983 | Japan . |
| 62117 | 4/1984 | Japan . |
| 122533 | 7/1984 | Japan . |
| 215034 | 10/1985 | Japan . |
| 230825 | 11/1985 | Japan . |
| 229731 | 11/1985 | Japan . |
| 79620 | 4/1986 | Japan . |
| 1044502 | 10/1966 | United Kingdom . |
| 1101950 | 2/1968 | United Kingdom . |

*Primary Examiner*—Herbert J. Lilling
*Attorney, Agent, or Firm*—Sughrue, Mion, Zinn, Macpeak & Seas

[57] ABSTRACT

A breathable film and a process for producing the same are disclosed, the breathable film comprising a resin composition comprising (1) 100 parts by weight of a linear low-density polyethylene resin having a density of from 0.870 to 0.915 g/cm$^3$ and containing from 15 to 50% by weight of a component which is extractable with xylene at room temperature and which has a weight average molecular chain length of from 1,000 to 9,000 Å; (2) from 50 to 400 parts by weight of a filler; and optionally, (3) from 0.5 to 8 parts by weight of a nonionic surface active agent. The breathable film of the invention not only has excellent film moldability and film stretchability but also shows high breathability, good touch and appearance, and high strength.

30 Claims, No Drawings

BREATHABLE FILM AND PROCESS FOR PRODUCTION OF THE SAME

FIELD OF THE INVENTION

The present invention relates to a breathable film and a process for production of the same. More particularly, it is concerned with a breathable film made of a resin composition containing a specified polyethylene resin as a resin component, which shows high breathability, good touch and appearance, and high strength as well as a process for the production of the same.

BACKGROUND OF THE INVENTION

It is known as described, for example, in Japanese Patent Application (OPI) NO. 149303/83 (the term "OPI" as used herein refers to a "published unexamined Japanese patent application") that breathable films which are permeable to gases such as water vapor but not to liquids such as water are obtainable by stretching films made of resin compositions comprising a resin, a filler, and so forth. In order to obtain films having high breathability, it is necessary to increase the proportion of the filler in the resin composition or to increase the stretch ratio.

These techniques to increase the breathability, however, decrease film moldability and the strength of formed films and, thus, are limited in their use. Accordingly, films having excellent film moldability and good film strength as well as high breathability cannot be obtained by these techniques. Another technique to increase the breathability wherein films are stretched at low temperatures has a disadvantage in that the resulting breathable films have poor touch and appearance.

SUMMARY OF THE INVENTION

An object of the present invention is to provide a breathable film which has not only excellent film moldability and film stretchability but also high breathability, good touch and appearance, and high strength.

Another object of the present invention is to provide a process for producing the above-described breathable film.

More specifically, in one embodiment of the present invention, it relates to a breathable film made of a resin composition comprising (1) 100 parts by weight of a linear low-density polyethylene resin having a density of from 0.870 to 0.915 g/cm$^3$ and containing from 15 to 50% by weight of a component which is extractable with xylene at room temperature and which has a weight average molecular chain length of from 1,000 to 9,000 Å; and (2) from 50 to 400 parts by weight of a filler.

In another embodiment, the present invention relates to a breathable film made of a resin composition comprising (1) 100 parts by weight of a linear low-density polyethylene resin having a density of from 0.870 to 0.915 g/cm$^3$ and containing from 15 to 50% by weight of a component which is extractable with xylene at room temperature and which has a weight average molecular chain length of from 1,000 to 9,000 Å; (2) from 50 to 400 parts by weight of a filler; and (3) from 0.5 to 8 parts by weight of a nonionic surface active agent.

In a further embodiment, the present invention relates to a process for producing a breathable film comprising uniaxially stretching a film made of a resin composition comprising (1) 100 parts by weight of a linear low-density polyethylene resin having a density of from 0.870 to 0.915 g/cm$^3$ and containing from 15 to 50% by weight of a component which is extractable with xylene at room temperature and which has a weight average molecular chain length of from 1,000 to 9,000 Å; and (2) from 50 to 400 parts by weight of a filler, at a temperature of from 30° to 80° C. at a stretch ratio of from 1.2 to 8 in the mechanical direction, or biaxially stretching said film at a temperature of from 40° to 100° C. at a stretch ratio of from 1.1 to 8.0 in the mechanical direction and then at a temperature of from 70° to 100° C. at a stretch ratio of not higher than 6.0 in the transverse direction.

In a still further embodiment, the present invention relates to a process for producing a breathable film comprising uniaxially stretching a film made of a resin composition comprising (1) 100 parts by weight of a linear low-density polyethylene resin having a density of from 0.870 to 0.915 g/cm$^3$ and containing from 15 to 50% by weight of a component which is extractable with xylene at room temperature and which has a weight average molecular chain length of from 1,000 to 9,000 Å; (2) from 50 to 400 parts by weight of a filler; and (3) from 0.5 to 8 parts by weight of a nonionic surface active agent at a temperature of from 30° to 80° C. at a stretch ratio of from 1.2 to 8 in the mechanical direction, or biaxially stretching said film at a temperature of from 40° to 100° C. at a stretch ratio of from 1.1 to 8.0 in the mechanical direction and then at a temperature of from 70° to 100° C. at a stretch ratio of not higher than 6.0 in the transverse direction.

DETAILED DESCRIPTION OF THE INVENTION

The term "room temperature" as referred to herein for measurement of the xylene content means a temperature of 25±1° C.

The term "excellent film moldability" as referred to herein means that light-gage films having a uniform thickness can be molded with neither film fracture nor formation of pinholes and at a high rate of molding; and the term "excellent film stretchability as referred to herein means that films can be stretched into light-gage films having a uniform thickness with neither unevenness in stretching nor film fracture.

The linear low-density polyethylene resin which is used in the present invention is one having a density of from 0.870 to 0.915 g/cm$^3$ and containing from 15 to 50% by weight, preferably from 20 to 30% by weight, of a component which is extractable with xylene at room temperature (this component being hereinafter referred to as "CXS component") and which has a weight average molecular chain length of from 1,000 to 9000 Å. If the weight average molecular chain length of the CXS component is less than 1,000 Å, the film moldability is reduced, and the film surface becomes sticky. On the other hand, if it is in excess of 9,000 Å since it becomes difficult to increase the proportion of the filler to be compounded in the resin composition, a breathable film having high breathability cannot be obtained. On the other hand, if it is in excess of 50% by weight, a film having a uniform thickness cannot be obtained. If the density is less than 0.870 g/cm$^3$, the film surface becomes sticky, and the strength and heat resistance of the film are reduced. On the other hand, if it is in excess of 0.915 g/cm$^3$, since the proportion of the filler to be compounded in the resin composition cannot be increased, a breathable film having high breathability cannot be obtained. The linear low-density polyethylene resin which is used in the present invention can be produced by known methods as described, for example, in Japanese Patent Application (OPI) Nos. 99209/81 and 230011/84.

Examples of the filler which can be used in the present invention include inorganic fillers such as carbonates (such as calcium carbonate, magnesium carbonate, and barium carbonate), sulfates (such as barium sulfate, magnesium sulfate, and calcium sulfate), phosphates (such as magnesium phosphate and calcium phosphate), hydroxides (such as magnesium hydroxide and aluminum hydroxide), oxides (such as alumina, silica, magnesium oxide, calcium oxide, zinc oxide, and titanium oxide), chlorides (such as zinc chloride and iron chloride), metal powders (such as aluminum powder, iron powder, and copper powder), mica, glass powder, zeolite, activated clay, diatomaceous earth, talc, carbon black, and volcanic ash; and organic fillers such as cellulose powders (such as wood powder and pulp powder) and synthetic powders (such as nylon powder, polyester powder, polycarbonate powder, polypropylene powder, and poly(4-methylpentene-1) powder). These compounds can be used alone or in combination with each other. From the viewpoints of breathability and touch and appearance of films, calcium carbonate, barium sulfate, and talc are particularly preferred. The average particle diameter of the filler is preferably from 0.1 to 20 μm and particularly preferably from 0.8 to 5.0 μm from the viewpoints of uniform film stretchability and touch and appearance. The amount of the filler to be compounded is from 50 to 400 parts by weight, preferably from 60 to 200 parts by weight, based on 100 parts by weight of the linear low-density polyethylene resin. If the amount of the filler is less than 50 parts by weight, the breathability is insufficient. On the other hand, if it is in excess of 400 parts by weight, the film moldability is reduced and, thus, not only films of uniform thickness cannot be obtained but also the strength of the film is low.

In the present invention, in order to increase the uniform dispersibility of the filler when the amount of the filler compounded is increased and further to maintain the excellent stretchability, a nonionic surface active agent is used. Examples of the nonionic surface active agent include glycerine esters and sorbitan esters of fatty acids having from 12 to 22 carbon atoms. It is particularly preferred that monoglycerine monostearate or diglycerine distearate is used alone or as a mixture thereof: The amount of the nonionic surface active agent to be compounded is from 0.5 to 8 parts by weight, preferably from 0.5 to 2 parts by weight, based on 100 parts by weight of the linear low-density polyethylene resin. If the amount of the nonionic surface active agent is less than 0.5 part by weight, the uniform dispersibility of the filler is low. On the other hand, if it is in excess of 8 parts by weight, problems such as bleeding out of the nonionic surface active agent contained in the film to the surface of the film arise.

The breathable film of the present invention can be produced as follows.

In the first place, a linear low-density polyethylene, a filler, and if desired, a nonionic surface active agent are mixed or kneaded by the usual procedures using a roll type or Banbury type kneader or extruder to form a resin composition. This resin composition is then molded into a film by usual film forming techniques such as inflation molding, calender molding, or T-die molding. Thereafter, the film is stretched either uniaxially or biaxially to impart breathability thereto.

In the case of uniaxial stretching, roll stretching is usually preferred. Stretching techniques such as tubular stretching in which the stretching direction is emphasized can be employed as well. This stretching can be performed by one-step process or two or more-step process. The stretch ratio is from 1.2 to 8, preferably from 1.6 to 2.5. If the stretch ratio is less than 1.2, the breathability is very low and the touch and appearance are poor. On the other hand, if it is in excess of 8, films of uniform thickness are difficult to obtain and, moreover, the resulting breathable film likely causes heat shrinkage. The temperature at which the stretching is performed is an important factor exerting influences on the breathability and touch and appearance of the breathable film obtained. In general, if the stretching is performed at high temperatures, the tough and appearance are good but the breathability is not high, while on the other hand, if the stretching is performed at low temperatures, the breathability is high but the touch and appearance are not good. The breathable film of the present invention as obtained by stretching at low temperatures, however, has high breathability and good touch and appearance at the same time. The temperature at which the stretching is performed in accordance with the present invention is preferably from 30 to 80° C. and more preferably from 40° to 60° C. from the viewpoints of breathability and tough and appearance.

In the case of biaxial stretching, the film is first stretched in the mechanical direction at a temperature of from 40° to 100° C. at a stretch ratio of from 1.1 to 8.0 and then in the transverse direction at a temperature of from 70° to 100° C. at a stretch ratio of not higher than 6. In the stretching in the mechanical direction, if the temperature is lower than 40° C., the film shrinks just after the stretching and, thus, no uniform film can be obtained. On the other hand, if the temperature is in excess of 100° C., high breathability cannot be obtained. If the stretch ratio is less than 1.1, high breathability is difficult to obtain, whereas if it is in excess of 8.0, the film strength balance cannot be obtained even by the subsequent stretching in the transverse direction. The subsequent stretching in the transverse direction is carried out for the purposes of greatly increasing the film breathability and at the same time, of maintaining the film strength balance. With regard to this stretching in the transverse direction, it is not preferred from the viewpoint of molding stability that the temperature is outside the range of from 70 to 100° C. and the stetch ratio is more than 6.0. In order to obtain films of high breathability at a low stretch ratio, it is more preferred for the biaxial stretching to be carried out by first stretching in the mechanical direction at a temperature of from 50° to 85° C. at a stretch ratio of from 1.2 to 4.0 and then stretching in the transverse direction at a temperature of from 80° to 95° C. at a stretch ratio of not higher than 3.0. The reason why the breathability is greatly increased by biaxial stretching is considered to be caused by the fact that microvoids formed by stretching in the mechanical direction at low temperatures are extended and deformed into a circular form by the subsequent stretching in the transverse direction because in the stretching in the transverse direction, they are exposed to high temperatures in the state that a tensile stress is applied. Further, the reason why the strength balance of the film is maintained is considered to be caused by the fact that the form of the microvoids and the state of orientation of the resin are changed. Accordingly, in the biaxial stretching, it is preferred that the stretchings in the mechanical and transverse directions are carried out successively under different stretching conditions; if the biaxial stretching is carried out at the same time, no satisfactory breathable films can be obtained. The stretching in the mechanical direction is preferably carried out by means of rolls and can be carried out by one-step process or two or more-step process. The stretching in the transverse direction is preferably carried out in hot air.

In order to more increase the breathability and to relieve the heat shrinkability, the film obtained by stretching as described above is preferably subjected to a subsequent heat setting treatment. The lower temperature limit in the heat setting treatment is 60° C., and the upper temperature limit is a temperature of 5° C. lower than Tm (the maximum peak temperature (° C.) of the linear low-density polyethylene as determined by the use of a differential scanning calorimeter). It is not preferred to apply the heat setting treatment for a period of time more than necessary because the breathability is reduced. Preferred conditions for the heat setting treatment are such that the temperature is about 10° C. lower than Tm and the period of time is from 0.3 to 30 seconds.

To the resin composition from which the breathable film of the present invention is obtained, antioxidants and antiblocking agents can be compounded within such ranges that the effects of the present invention are not substantially impaired.

In accordance with the present invention, breathable films having excellent film moldability and film stretchability and further showing high breathability, good touch and appearance, and high strength can be obtained by using a resin composition containing a specified polyethylene resin as a resin component.

As set forth in the Examples and Comparative Examples as described hereinafter, if polyethylene resins other than the specified polyethylene resin of the present invention are used or other construction requirements of the present invention are not met, breathable films of the present invention cannot be obtained.

In accordance with the present invention, desired breathable films can be obtained efficiently. When a specified polyethylene resin of the present invention is used, biaxial stretching which has been considered to be difficult to apply when the usual polyethylene resins are used can be applied and, thus, high breathability can be attained by applying stretching at low stretch ratios.

The breathable film obtained by the present invention can be used in various applications for, e.g., leisure wear, sportswear, tent, mesh, clothings, wall paper, wrapping materials, packagings for medical and health care products, disposable diapers, feminine hygiene products, rainwear, medical treatment, drapes, gowns, sterile wraps, bandages, wound dressings, herbicide release, etc.

The present invention is described below in greater detail with reference to the following examples.

Methods of measuring the physical properties shown in the Examples and Comparative Examples are as follows.

Weight Average Molecular Chain Length

The weight average molecular chain length of the CXS component was measured by the use of a gel permeation chromatograph (GPC) Model 811 (produced by Toyo Soda Manufacturing Co., Ltd.) provided with two columns of GMH6-HD at a temperature of 130° C., with polystyrene being taken as a standard.

Density

The density of the resin was measured at 23° C. by the density gradient tube method according to JIS K6760-1981.

Breathability

The breathability of the film was determined by measuring the amount of air which passed through the film during the time of 1 minute when an air pressure of 0.2 kg/cm² was applied at room temperature.

Shrinkage Ratio

The heat shrinkability of the breathable film was indicated in terms of a ratio (percent) of shrinked length of the film when it was treated at 80° C. for 60 minutes to the original length of the film. This measurement was conducted in both the mechanical direction (hereinafter referred to as "MD") and the transverse direction (hereinafter referred to as "TD").

Tear Strength

The Elmendorf tear strength of the breathable film was measured according to JIS P8116 in both MD and TD.

Touch and Appearance

The touch and appearance of the breathable film were determined by touching with a hand and observing by eyes. The rating were as follows:
◎: touch and no unevenness in stretching observed.
◯: Good touch but some unevenness in stretching observed.
△: Somewhat stiff touch and some unevenness in stretching observed.
×: Considerably stiff touch and serious unevenness in stretching observed.

Melt Flow Rate

The melt flow rate of the resin (hereinafter referred to as "MFR") was measured according to JIS K6760.

Tensile Strength

The tensile strength at breakage was measured according to JIS Z1702 in both MD and TD.

EXAMPLE 1

100 parts by weight of linear low-density polyethylene containing 25% by weight of a CXS component having a weight average molecular chain length of 6,000 Å and having a density of 0.9003 g/cm³ and an MFR of 1.9, 170 parts by weight of calcium carbonate having an average particle diameter of 1.25 μm, and 3.3 parts by weight of monoglycerine monostearate were previously mixed in a tumbling mixer Model MT50 (manufactured by Morita Seiki Co., Ltd.) and then kneaded at from 120° to 150° C. for 5 minutes by the use of a Banbury mixer Model BR (manufactured by Kobe Seiko Co., Ltd.). The resin composition thus obtained was subjected to inflation molding by the use of a 50 mmφ extruder Model EA-50 (die diameter 100 mmφ; spiral die; manufactured by Modern Machinery Co., Ltd.) to produce a 120 μm-thick film. Conditions for the extrusion molding were such that the cylinder temperature was 170° C. in the vicinity of the bottom of hopper, 170° C. in the central portion, and 190° C. in the vicinity of the head, respectively; the head and die temperatures were respectively 190° C.; and the blow ratio was about 2.0. This film was uniaxially stretched in MD at a temperature of 65° C. at a stretch ratio of 4 by the use of a roll stretching machine (manufactured by Nippon Seiko Co., Ltd.) to produce a breathable film having a thickness of about 35 $\mu$m. The results are shown in Table 1. The breathability and touch and appearance of the film were good.

EXAMPLE 2

A breathable film was produced in the same manner as in Example 1 except that 210 parts by weight of barium sulfate having an average particle diameter of 0.6 $\mu$m as a filler and 5.0 parts by weight of diglycerine distearate as a nonionic surface active agent were used. The results are shown in Table 1. The breathability and touch and appearance of the resulting breathable film were good.

EXAMPLE 3

The breathable film obtained in Example 1 was subjected to heat setting at 95° C. for 6 seconds. The results are shown in Table 1. The breathability was greatly increased as compared with in Example 1 and, furthermore, the shrinkage ratio was small.

EXAMPLE 4

A breathable film was produced in the same manner as in Example 1 except that the nonionic surface active agent was not used. The results are shown in Table 1. The breathability and touch and appearance of the film were good.

EXAMPLE 5

A breathable film was produced in the same manner as in Example 1 except that 200 parts by weight of MS talc (produced by Nippon Talc Co., Ltd.) as a filler was used and no nonionic surface active agent was used. The breathability and touch and appearance of the breathable film were good.

COMPARATIVE EXAMPLE 1

A film having a thickness of about 35 $\mu$m was produced by stretching a 120 $\mu$m-thick film in the same manner as in Example 1 except that the proportion of the calcium carbonate to be compounded was changed to 43 parts by weight. The results are shown in Table 1. As compared with Example 1, the stretched film had no breathability at all, and its shrinkage ratio was very large.

COMPARATIVE EXAMPLE 2

A breathable film was produced in the same manner as in Example 4 except that as the polyethylene resin, linear low-density polyethylene having 5% by weight of the CXS component, a density of 0.925 g/cm$^3$, and an MFR of 1.5 was used. The results are shown in Table 1. Heat shrinkability of the film was good, but as compared with Example 4, the touch and appearance of the film were very bad.

COMPARATIVE EXAMPLE 3

A breathable film was produced in the same manner as in Example 4 except that the film was uniaxially stretched in MD at a temperature of 113° C. at a stretch ratio of 1.5 by the use of rolls. The results are shown in Table 1. As compared with Example 4, the breathable film had almost no breathability, and its touch and appearance were not good.

COMPARATIVE EXAMPLE 4

A resin composition was produced in the same manner as in Example 1 except that the amount of the calcium carbonate to be compounded was changed to 153 parts by weight. This resin composition was molded into a 60 $\mu$m-thick film by the same inflation molding method as in Example 1, and the film thus obtained was uniaxially stretched in MD at a temperature of 65° C. at a stretch ratio of 1.5 by the use of rolls to produce a breathable film having a thickness of about 40 $\mu$m. The results are shown in Table 1. As compared with Example 1, the stretched film had no breathability, and its touch and appearance were not good.

COMPARATIVE EXAMPLE 5

A resin composition was prepared in the same manner as in Example 1 except that the amount of the calcium carbonate to be compounded was changed to 450 parts by weight. While it was attempted to make a film from this resin composition, no film was obtained because the amount of the filler used was too large.

EXAMPLE 6

A 60 $\mu$m-thick film obtained by inflation molding in the same manner as in Example 1 was stretched in MD at a temperature of 65° C. at a stretch ratio of 5.0 to produce a breathable film having a thickness of 22 $\mu$m. The results are shown in Table 1.

EXAMPLE 7

A 60 $\mu$m-thick film was obtained by inflation molding in the same manner as in Example 1 was uniaxially stretched in MD at a temperature of 65° C. at a stretch ratio of 1.5 by the use of rolls and, then, in TD at a temperature of 90° C. in hot air at a stretch ratio of 1.5 to produce a breathable film. The results are shown in Table 1. The breathability and touch and appearance of the film were good, and the film had a balanced strength.

EXAMPLES 8 TO 11

Breathable films were produced in the same manner as in Example 7 except that the stretch ratio and temperature in the stretching in MD and TD were changed as shown in Table 1. The results are shown in Table 1. The breathability and touch and appearance of the film were good, and the film had a balanced strength.

EXAMPLES 12 AND 13

Breathable films were produced in the same manner as in Example 7 except that the amount of the nonionic surface active agent used was changed as shown in Table 1. The results are shown in Table 1. The breathability and touch and appearance of the film were good, and the film had a balanced strength.

COMPARATIVE EXAMPLE 6

A 120 $\mu$m-thick film was produced by inflation molding in the same manner as in Example 7 except that the amount of the calcium carbonate to be compounded was changed to 43 parts by weight. The film was uniaxially stretched in MD at a temperature of 75° C. at a stretch ratio of 4 by the use of rolls and, then, in TD at a temperature of 90° C. in hot air at a stretch ratio of 1.25 to produce a stretched film having a thickness of about 35 μm. The results are shown in Table 1. This film did not have breathability at all.

COMPARATIVE EXAMPLE 7

While it was attempted to stretch a 60 μm-thick film obtained by inflation molding as in Example 7 in MD at a temperature of 65° C. at a stretch ratio of 1.5 and, then, in TD at a temperature of 105° C. at a stretch ratio of 1.25, film cutting occurred and, hence, a breathable film could not be obtained.

COMPARATIVE EXAMPLE 8

A 60 μm-thick film was produced by inflation molding in the same manner as in Example 7 except that as the polyethylene resin, a high-pressure polyethylene resin having a density of 0.925 g/cm³ and an MFR of 1.5 was used. While it was attempted to stretch this film in MD at a temperature of 95° C. at a stretch ratio of 1.5 and, then, in TD at a temperature of 110° C. at a stretch ratio of 1.25, film cutting occurred and, hence, a breathable film could not be obtained.

COMPARATIVE EXAMPLE 9

A breathable film was produced in the same manner as in Example 7 except that 9.0 parts by weight of monoglycerine monostearate as the nonionic surface active agent was used. The results are shown in Table 1. The breathable film obtained had high breathability and balanced strength. However, the monoglycerine monostearate bleeded out to the surface of the film, and the film had no value as a commercial product.

TABLE 1

| Example or Comparative Example | Polyethylene Resin Type[1] | Parts by weight | Filler Type | Parts by weight | Nonionic Surface Active Agent Type[2] | Parts by weight | Film Thickness (μm) | Stretching in MD Temperature (°C.) | Ratio | Stretching in TD Temperature (°C.) | Ratio |
|---|---|---|---|---|---|---|---|---|---|---|---|
| Example 1 | A | 100 | CaCO₃ | 170 | M | 3.3 | 120 | 65 | 4 | — | — |
| Example 2 | A | 100 | BaCO₄ | 210 | D | 5.0 | 120 | 65 | 4 | — | — |
| Example 3[3] | A | 100 | CaCO₃ | 170 | M | 3.3 | 120 | 65 | 4 | — | — |
| Example 4 | A | 100 | CaCO₃ | 170 | — | — | 120 | 65 | 4 | — | — |
| Example 5 | A | 100 | MS talc | 200 | — | — | 120 | 65 | 4 | — | — |
| Comparative Example 1 | A | 100 | CaCO₃ | 43 | M | 3.3 | 120 | 65 | 4 | — | — |
| Comparative Example 2 | B | 100 | CaCO₃ | 170 | — | — | — | 65 | 4 | — | — |
| Comparative Example 3 | A | 100 | CaCO₃ | 170 | — | — | 120 | 113 | 1.5 | — | — |
| Comparative Example 4 | A | 100 | CaCO₃ | 153 | M | 3.3 | 60 | 65 | 1.5 | — | — |
| Comparative Example 5 | A | 100 | CaCO₃ | 450 | M | 3.3 | Molding was not possible. | | | | |
| Example 6 | A | 100 | CaCO₃ | 170 | M | 3.3 | 60 | 65 | 5.0 | — | — |
| Example 7 | A | 100 | CaCO₃ | 170 | M | 3.3 | 60 | 65 | 1.5 | 90 | 1.5 |
| Example 8 | A | 100 | CaCO₃ | 170 | M | 3.3 | 60 | 65 | 2.0 | 90 | 1.5 |
| Example 9 | A | 100 | CaCO₃ | 170 | M | 3.3 | 60 | 65 | 2.0 | 90 | 1.25 |
| Example 10 | A | 100 | CaCO₃ | 170 | M | 3.3 | 60 | 65 | 3.5 | 93 | 1.20 |
| Example 11 | A | 100 | CaCO₃ | 170 | M | 3.3 | 60 | 65 | 3.0 | 85 | 1.5 |
| Example 12 | A | 100 | CaCO₃ | 170 | M | 0.8 | 60 | 65 | 1.5 | 90 | 1.5 |
| Example 13 | A | 100 | CaCO₃ | 170 | M | 6.5 | 60 | 65 | 1.5 | 90 | 1.5 |
| Comparative Example 6 | A | 100 | CaCO₃ | 43 | M | 3.3 | 120 | 75 | 4 | 90 | 1.25 |
| Comparative Example 7 | A | 100 | CaCO₃ | 170 | M | 3.3 | 60 | 65 | 1.5 | 105 | 1.25 |
| Comparative Example 8 | B | 100 | CaCO₃ | 170 | M | 3.3 | 60 | 95 | 1.5 | 110 | 1.25 |
| Comparative Example 9 | A | 100 | CaCO₃ | 170 | M | 9.0 | 60 | 65 | 1.5 | 90 | 1.5 |

| Example of Comparative Example | Thickness of Breathable Film (μm) | Degree of Breathability (cc/min) | Tear Strength (kg/cm²) MD | TD | Tensile Strength MD | TD | Shrinkage Ratio (%) MD | TD | Touch and Appearance |
|---|---|---|---|---|---|---|---|---|---|
| Example 1 | about 35 | 210 | 20 | 200 | — | — | 53 | 0 | ⊚ |
| Example 2 | about 35 | 180 | 25 | 210 | — | — | 42 | −1 | ⊚ |
| Example 3[3] | about 35 | 400 | 9 | 110 | — | — | 10 | 1 | ⊚ |
| Example 4 | about 35 | 224 | 17 | 189 | — | — | 48 | −1 | ○ |
| Example 5 | about 35 | 245 | 15 | 177 | — | — | 44 | −1 | ○ |
| Comparative Example 1 | about 35 | 0 | 260 | 630 | — | — | 70 | −14 | ○~Δ |
| Comparative Example 2 | — | 513 | 8 | 101 | — | — | 17 | −2 | X |
| Comparative Example 3 | about 35 | 2 | 89 | 293 | — | — | 6 | −1 | X |
| Comparative Example 4 | 40 | 0 | — | — | — | — | | | X |
| Comparative Example 5 | | | | | — | | | | |
| Example 6 | 22 | 262 | 5 | 143 | 240 | 29 | 64 | −3 | ○ |
| Example 7 | — | 480 | 61 | 120 | 105 | 85 | 6 | 8 | ○ |
| Example 8 | — | 1220 | 29 | 58 | 112 | 76 | 9 | 8 | ⊚ |
| Example 9 | — | 270 | 102 | 163 | 158 | 90 | 9 | 6 | ○ |

TABLE 1-continued

| | | | | | | | | | |
|---|---|---|---|---|---|---|---|---|---|
| Example 10 | — | 316 | 27 | 86 | 102 | 23 | 11 | 5 | ○ |
| Example 11 | — | 1880 | 18 | 26 | 147 | 71 | 10 | 8 | ◉ |
| Example 12 | — | 570 | 56 | 114 | 102 | 80 | 6 | 5 | ○ |
| Example 13 | — | 450 | 63 | 121 | 111 | 93 | 10 | 8 | ○ |
| Comparative Example 6 | about 35 | 0 | — | — | — | — | — | — | △ |
| Comparative Example 7 | Film cutting occurred. | | | | | | | | |
| Comparative Example 8 | Film cutting occurred. | | | | | | | | |
| Comparative Example 9 | — | 461 | 62 | 119 | 115 | 90 | 9 | 7 | X |

[Note]
(1):

| Type | Weight Average Molecular Chain Length (Å) | Content of CXS Component (wt %) | Density (g/cm³) | MFR |
|---|---|---|---|---|
| A | 6,000 | 25 | 0.9003 | 1.9 |
| B | — | 5 | 0.925 | 1.5 |

(2): M: monoglycerine monostearate
D: diglycerine distearate
(3): The breathable film of the Example 1 was subjected to heat setting.

While the invention has been described in detail and with reference to specific embodiments thereof, it will be apparent to one skilled in the art that various changes and modifications can be made therein without departing from the spirit and scope thereof.

What is claimed is:

1. A breathable film comprising a resin composition comprising (1) 100 parts by weight of a linear low-density polyethylene resin having a density of from 0.870 to 0.915 g/cm³ and containing from 15 to 50% by weight of a component which is extractable with xylene at room temperature and which has a weight average molecular chain length of from 1,000 to 9,000 Å; and (2) from 50 to 400 parts by weight of a filler.

2. A breathable film comprising a resin composition comprising (1) 100 parts by weight of a linear low-density polyethylene resin having a density of from 0.870 to 0.915 g/cm³ and containing from 15 to 50% by weight of a component which is extractable with xylene at room temperature and which has a weight average molecular chain length of from 1,000 to 9,000 Å; (2) from 50 to 400 parts by weight of a filler; and (3) from 0.5 to 8 parts by weight of a nonionic surface active agent.

3. A process for producing a breathable film comprising uniaxially stretching a film comprising a resin composition comprising (1) 100 parts by weight of a linear low-density polyethylene resin having a density of from 0.870 to 0.915 g/cm³ and containing from 15 to 50% by weight of a component which is extractable with xylene at room temperature and which has a weight average molecular chain length of from 1,000 to 9,000 Å; and (2) from 50 to 400 parts by weight of a filler, at a temperature of from 30° to 80° C. at a stretch ratio of from 1.2 to 8 in the mechanical direction, or biaxially stretching said film at a temperature of from 40° to 100° C. at a stretch ratio of from 1.1 to 8.0 in the mechanical direction and then at a temperature of from 70° to 100° C. at a stretch ratio of not higher than 6.0 in the transverse direction.

4. A process for producing a breathable film comprising uniaxially stretching a film comprising a resin composition comprising (1) 100 parts by weight of a linear low-density polyethylene resin having a density of from 0.870 to 0.915 g/cm³ and containing from 15 to 50% by weight of a component which is extractable with xylene at room temperature and which has a weight average molecular chain length of from 1,000 to 9,000 Å; (2) from 50 to 400 parts by weight of a filler; and (3) from 0.5 to 8 parts by weight of a nonionic surface active agent at a temperature of from 30° to 80° C. at a stretch ratio of from 1.2 to 8 in the mechanical direction, or biaxially stretching said film at a temperature of from 40° to 100° C. at a stretch ratio of from 1.1 to 8.0 in the mechanical direction and then at a temperature of from 70° to 100° C. at a stretch ratio of not higher than 6.0 in the transverse direction.

5. A breathable film as in claim 1, wherein said linear low-density polyehtylene resin contains from 20 to 30% by weight of a component which is extractable with xylene at room temperature.

6. A breathable film as in claim 2, wherein said linear low-density polyethylene resin contains from 20 to 30% by weight of a component which is extractable with xylene at room temperature.

7. A process as in claim 3, wherein said linear low-density polyehtylene resin contains from 20 to 30% by weight of a component which is extractable with xylene at room temperature.

8. A process as in claim 4, wherein said linear low-density polyethylene resin contains from 20 to 30% by weight of a component which is extractable with xylene at room temperature.

9. A breathable film as in claim 1, wherein said resin composition contains from 60 to 200 parts by weight of said filler based on 100 parts by weight of said linear low-density polyethylene resin.

10. A breathable film as in claim 2, wherein said resin composition contains from 60 to 200 parts by weight of said filler based on 100 parts by weight of said linear low-density polyethylene resin.

11. A process as in claim 3, wherein said resin composition contains from 60 to 200 parts by weight of said filler based on 100 parts by weight of said linear low-density polyethylene resin.

12. A process as in claim 4, wherein said resin composition contains from 60 to 200 parts by weight of said filler based on 100 parts by weight of said linear low-density polyethylene resin.

13. A breathable film as in claim 2, wherein said resin composition contains from 0.5 to 2 parts by weight of said nonionic surface active agent based on 100 parts by weight of said linear low-density polyethylene resin.

14. A process as in claim 4, wherein said resin composition contains from 0.5 to 2 parts by weight of said nonionic surface active agent based on 100 parts by weight of said linear low-density polyethylene resin.

15. A process as in claim 3, wherein the uniaxial stretching is carried out at a temperature of from 40° to 60° C. at a stretch ratio from 1.6 to 2.5 in the mechanical direction.

16. A process as in claim 4, wherein the uniaxial stretching is carried out at a temperature of from 40° to 60° C. at a stretch ratio from 1.6 to 2.5 in the mechanical direction.

17. A process as in claim 3, wherein the biaxial stretching is carried out first at a temperature of from 50° to 85° C. at a stretch ratio of from 1.2 to 4.0 in the mechanical direction and then at a temperature of from 80° to 95° C. at a stretch ratio of not higher than 3.0 in the transverse direction.

18. A process as in claim 4, wherein the biaxial stretching is carried out first at a temperature of from 50° to 85° C. at a stretch ratio of from 1.2 to 4.0 in the mechanical direction and then at a temperature of from 80° to 95° C. at a stretch ratio of not higher than 3.0 in the transverse direction.

19. A breathable film as in claim 1, wherein said filler is calcium carbonate, barium sulfate, or talc.

20. A breathable film as in claim 2, wherein said filler is calcium carbonate, barium sulfate, or talc.

21. A process as in claim 3, wherein said filler is calcium carbonate, barium sulfate, or talc.

22. A process as in claim 4, wherein said filler is calcium carbonate, barium sulfate, or talc.

23. A process as in claim 3, wherein the resulting breathable film is subjected to a heat setting treatment at a temperature of from 60° C. to a temperature of 5° C. lower than the maximum peak temperature of the linear low-density polyethylene as determined by the use of a differential scanning calorimeter.

24. A process as in claim 4, wherein the resulting breathable film is subjected to a heat setting treatment at a temperature of from 60° C. to a temperature of 5° C. lower than the maximum peak temperature of the linear low-density polyethylene as determined by the use of a differential scanning calorimeter.

25. A breathable film as in claim 1, wherein said filler has an average particle diameter of from 0.1 to 20 μm.

26. A breathable film as in claim 2, wherein said filler has an average particle diameter of from 0.1 to 20 μm.

27. A process as in claim 3, wherein said filler has an average particle diameter of from 0.1 to 20 μm.

28. A process as in claim 4, wherein said filler has an average particle diameter of from 0.1 to 20 μm.

29. A breathable film as in claim 2, wherein said nonioic surface active agent is monoglycerine monostearate or diglycerine distearate.

30. A process as in claim 4, wherein said nonioic surface active agent is monoglycerine monostearate or diglycerine distearate.

* * * * *